United States Patent
Stolfig

(10) Patent No.: US 8,435,444 B2
(45) Date of Patent: May 7, 2013

(54) MAGNESIUM ALLOY

(75) Inventor: Peter Stolfig, Geisenfeld (DE)

(73) Assignee: TechMag AG, Baar (CH)

( * ) Notice: Subject to any disclaimer, the term of this patent is extended or adjusted under 35 U.S.C. 154(b) by 0 days.

(21) Appl. No.: 12/583,790

(22) Filed: Aug. 26, 2009

(65) Prior Publication Data
US 2011/0048169 A1 Mar. 3, 2011

(51) Int. Cl.
*C22C 23/06* (2006.01)

(52) U.S. Cl.
USPC .......................................... 420/405; 420/413

(58) Field of Classification Search .................. 420/405, 420/413
See application file for complete search history.

(56) References Cited

U.S. PATENT DOCUMENTS

| | | | | |
|---|---|---|---|---|
| 2,054,054 A | * | 9/1936 | Jarman | 428/646 |
| 5,681,403 A | | 10/1997 | Makino et al. | |
| 5,811,058 A | | 9/1998 | Baba et al. | |
| 6,264,762 B1 | | 7/2001 | Bommer et al. | |
| 6,544,357 B1 | * | 4/2003 | Hehmann et al. | 148/420 |
| 2010/0054985 A1 | | 3/2010 | Dieringa et al. | |

FOREIGN PATENT DOCUMENTS

| | | |
|---|---|---|
| DE | 679 156 | 7/1939 |
| DE | 806 055 | 6/1951 |
| DE | 42 08 504 | 9/1993 |
| DE | 44 46 898 | 7/1996 |
| DE | 196 38 764 | 3/1998 |
| DE | 199 15 276 | 10/2000 |
| DE | 697 04 801 | 8/2001 |
| DE | 112005001529 | 7/2007 |
| DE | 102006015457 | 10/2007 |
| DE | 602004004537 | 10/2007 |
| DE | 112005000511 | 11/2007 |
| DE | 112006001375 | 4/2008 |
| DE | 602004008797 | 6/2008 |
| DE | 602004009260 | 7/2008 |
| DE | 112007000673 | 2/2009 |
| DE | 102007061561 | 6/2009 |
| DE | 112007002016 | 7/2009 |
| DE | 102008020523 | 10/2009 |
| DE | 102008039683 | 3/2010 |
| EP | 1553195 | 7/2005 |
| EP | 1813689 | 8/2007 |
| EP | 1967600 | 9/2008 |
| EP | 2135965 | 12/2009 |
| EP | 2138594 | 12/2009 |
| EP | 2138595 | 12/2009 |
| EP | 2159293 | 3/2010 |
| EP | 2210964 | 7/2010 |
| EP | 2264200 | 12/2010 |
| WO | WO-2006/105594 | 10/2006 |
| WO | WO-2007/009435 | 1/2007 |

OTHER PUBLICATIONS

Machine translation of DE 19915238 published Oct. 2000.*
Derwent Acc No. 2000-603198 for patent family including DE 19915238 (Haferkamp et al) published Oct. 5, 2000.*

* cited by examiner

*Primary Examiner* — George Wyszomierski
*Assistant Examiner* — Tima M McGuthry Banks
(74) *Attorney, Agent, or Firm* — Jordan and Hamburg LLP

(57) ABSTRACT

Magnesium alloy having the composition
  Manganese 1.5 to 2.2
  Cerium 0.5 to 2.0
  Lanthanum 0.2 to 2.0,
these figures indicating the weight percent for the alloy, and magnesium and production-related impurities accounting for the remainder of the alloy to 100 wt. %.

5 Claims, No Drawings

MAGNESIUM ALLOY

BACKGROUND OF THE INVENTION

The invention relates to a magnesium alloy for technical applications and to the use of such an alloy for producing extruded semi-finished products and components and for producing sheet.

Magnesium alloys are lightweight materials that are used in automotive engineering, engine construction, aerospace engineering, and other lightweight designs.

With very good strength properties and a low specific weight, magnesium alloys are especially suitable as metal construction materials for vehicle and aircraft construction.

Especially in vehicle construction it is necessary to reduce weight because additional elements are built in due to rising standards for comfort and safety. Lightweight construction is also important for the design of energy-saving vehicles. When processing magnesium materials, the methods used—primary shaping by die-casting and shaping by extrusion, forging, rolling, stretch-forming or deep-drawing—become increasingly significant. Lightweight components that are enjoying increasing demand, especially for vehicle construction, can be produced using these methods.

Known from DE 806 0055 is a magnesium alloy that constitutes a composition of 0.5 to 10% metals from the group of rare earths, and the remainder magnesium, with the provision that the rare earths constitute at least 50%, preferably at least 75% neodymium, at most up to 25% lanthanum and cerium separately or together, and praseodym and small quantities of samarium and traces of the elements of the yttrium group as the remainder, one or a plurality of the following elements being added: manganese, aluminum, calcium, thorium, mercury, beryllium, zinc, cadmium, and zirconium.

Known from DE 42 08 504 A1 is a magnesium alloy that contains 2 to 8% rare earth metals, the rare earth metal comprising samarium.

Other alloys that in addition to the main component include magnesium, manganese, and other elements from the group of the rare metals and/or aluminum, copper, iron, nickel, calcium, etc., are known for instance from DE 199 15 276 A1, DE 196 38 764 A1, DE 679 156, DE 697 04 801 T2, DE 44 46 898 A1.

The known magnesium alloys have various disadvantages.

In the presence of calcium, heat cracks can occur after casting in a casting process that has a rapid cooling speed, for instance injection molding. The strength of alloys that include magnesium-aluminum-zinc-manganese or magnesium-aluminum-manganese declines at higher temperatures.

Overall the shaping behavior, weldability, and resistance to corrosion deteriorate.

The cold formability of the most common magnesium alloys is limited due to their hexagonal crystal structure and low ductility. Most magnesium alloys are brittle at room temperature. For certain shaping methods for producing semi-finished products from magnesium alloys, ductility is necessary in addition to high tensile strength. Higher ductility enables improved shaping and forming, and sometimes also higher strength and toughness. Many of the known magnesium alloys have properties that vary widely with the production condition.

SUMMARY OF THE INVENTION

The object of the invention is to develop a magnesium alloy that is suitable for producing sheet, welding rod, extrusion and/or diecast profiles or components, that is, that has good forming properties, high resistance to corrosion, improved weldability, a high yield point, and good cold formability.

This is inventively attained using a magnesium alloy having the composition
Manganese 1.5 to 2.2
Cerium 0.5 to 2.0
Lanthanum 0.2 to 2.0,
these figures indicating the weight percent (wt. %) for the alloy, and magnesium and production-related impurities accounting for the remainder of the alloy to 100 wt. %.

DETAILED DESCRIPTION OF THE INVENTION

The magnesium alloy has a tensile yield strength Rp 0.2 of at least 140 Mpa and good strength properties across a wide range of temperatures and has a high creep resistance with adequate formability.

The inventive magnesium alloy can be used for producing sheet, semi-finished products, or extrusion and/or diecast parts and profiles and for producing welding rods. These can then be used to produce special parts, preferably for use in vehicle construction, train construction, ship-building, and aircraft construction, such as seat, window, and door frames, vehicle outer skins, housings, supports, mounts, columns, and other small parts.

One particularly advantageous composition of the inventive magnesium alloy results when it comprises the components 97% magnesium, 1.8% manganese, 0.6% cerium, and 0.4% lanthanum, the remainder being production-related impurities.

The alloy having this composition is distinguished by good corrosion resistance, improved cold forming behavior, low warm creep behavior, and a high tensile yield point.

This magnesium alloy can be used in particular for producing sheet, extrusion and/or diecast profiles and components, and for producing drawn welding rods.

The invention claimed is:

1. Magnesium alloy consisting essentially of, by weight,
Manganese 1.5 to 2.2%
Cerium 0.5 to 2.0%
Lanthanum 0.2 to 2.0%,
and the balance magnesium and production-related impurities wherein the alloy is free of aluminum.

2. Magnesium alloy in accordance with claim 1, having a tensile yield strength Rp 0.2 of at least 140 Mpa.

3. A drawn welding rod consisting essentially of the magnesium alloy of claim 1.

4. An extruded or diecast part consisting essentially of a magnesium alloy according to claim 1.

5. Magnesium alloy is accordance with claim 1. consisting essentially of, by weight,
Manganese 1.8%
Cerium 0.6%
Lanthanum 0.4%,
and at least 97% magnesium, the remainder being production-related impurties.

* * * * *